Aug. 26, 1969 H. B. S. BRABHAM 3,464,015
NETWORK FOR MATCHING AN AERIAL TO A RADIO TRANSMITTER
Filed Nov. 3, 1966
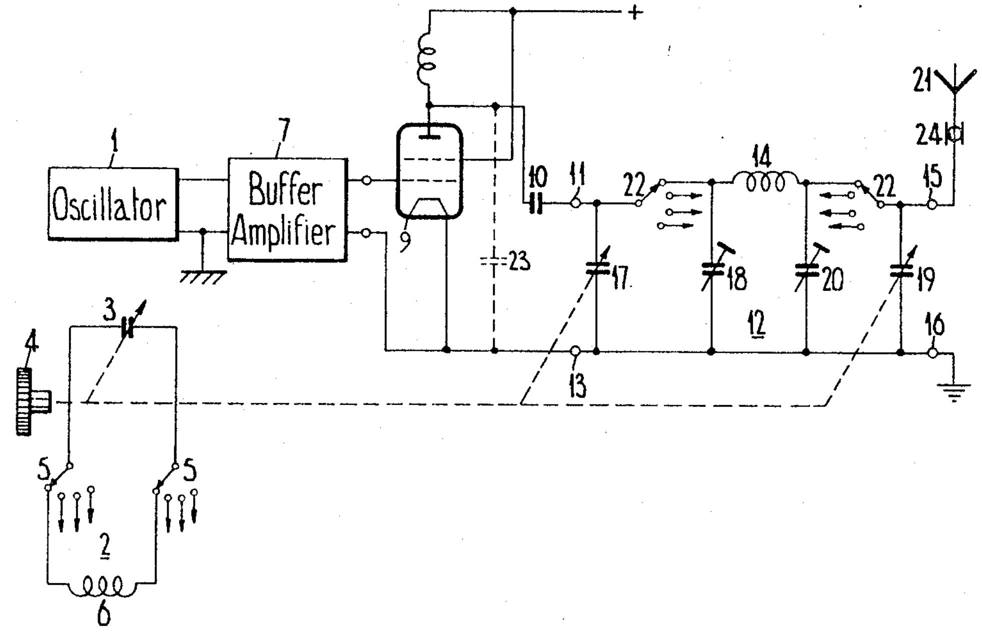
INVENTOR
Hugh Basil Schofield Brabham
BY
Lindenberg, Lindenberg & Steiger
ATTORNEYS United States Patent Office 3,464,015

Patented Aug. 26, 1969

3,464,015
NETWORK FOR MATCHING AN AERIAL TO A RADIO TRANSMITTER

Hugh Basil Schofield Brabham, Netley Abbey, Southampton, England, assignor to The General Electric Company Limited, London, England, a British company Filed Nov. 3, 1966, Ser. No. 591,887
Claims priority, application Great Britain, Nov. 5, 1965, 47,111/65
Int. Cl. H04b *1/04, 1/66*
U.S. Cl. 325—172 6 Claims

ABSTRACT OF THE DISCLOSURE

A radio transmitter utilizing a matching network of π-configuration to match the aerial to the final stage of the transmitter wherein capacitances in the shunt arms of the network are ganged to a variable reactance controlling the frequency of the output of the transmitter so that the tuning of the network and the frequency of the output of the transmitter are adjustable in step over a range of frequencies by means of a common control member.

This invention relates to radio transmitters.

It is common practice in radio transmitters to feed the output signal of the final stage of the transmitter to an aerial via a matching network of π configuration incorporating an inductance in its series arm and a capacitance in eac hof its shunt arms.

According to the present invention, in a radio transmitter wherein the output signal of the final stage of the transmitter is arranged to be fed to an aerial in operation via a matching network of π-configuration incorporating an inductance in its series arm and a capacitance in each of its shunt arms, said capacitances are both variable in value and are ganged to a variable reactance element on whose value the frequency of the output of the transmitter depends, so that the tuning of the network and the frequency of the output of the transmitter are adjustable in step over a range of frequencies by means of a common control member.

In known radio transmitters in which the output of the final stage of the transmitter is fed to an aerial via a π-network of the kind described above, because the tuning laws of the capacitances in the network are different from one another and from the tuning law of the variable reactance controlling the frequency of the output of the transmitter, it is the practice to arrange for the capacitances in the network to be tuned individually and separately from the variable reactance element. The present invention resides in the appreciation by the inventor that the errors introduced by ganging the network capacitances to the variable reactance controlling the transmitter frequency are, in fact, quite small.

One radio transmitter in accordance with the invention will now be described, by way of example, with reference to the accompanying drawing which is a block diagram of the transmitter with the final stage shown in detail.

Referring to the drawing, the transmitter is, for the most part, of conventional form and includes a variable frequency oscillator 1 whose frequency is variable in four bands over the range 30 mc./s. to 100 mc./s., each band having a tuning ratio of 1.36:1. The frequency determining element of the oscillator comprises a parallel resonant circuit 2 incorporating a variable capacitor 3 whose value varies linearly with the angular position of its shaft, the position of the shaft being manually adjustable by means of a control knob 4. The oscillator 1 also incorporates a swtich 5 by means of which a different one of four inductors 6 of different values is connected with the variable capacitor 3 on each of the four bands. In the drawing only one of the inductors 6 is shown for the sake of clarity.

The output of the variable frequency oscillator 1 is fed via a buffer amplifier 7 to an output stage capable of delivering an output power of 50 watts, the output stage incorporating a tetrode valve 9 which operates under Class C conditions and has an anode shunt capacity (represented in the drawing by a capacitor 23) of about 10 picofarads.

An output is fed from the anode of the tetrode 9 via a D.C. blocking capacitor 10 to one input terminal 11 of a π-network 12, the other input terminal 13 being grounded. The π-network 12 comprises: an inductor 14 connected between the ungrounded input terminal 11 and one of a pair of output terminals 15, the other output terminal 16 being grounded; a first variable capacitor 17 and a first pre-set capacitor 18 connected in parallel between the input terminals 11 and 13; and a second variable capacitor 19 and a second pre-set capacitor 20 connected in parallel between the output terminals 15 and 16. The output of the π-network 12 is applied to an aerial 21 having a normal input impedance of 50 ohms by way of a 50 ohm feeder cable 24.

The network 12 is associated with a switch 22 by means of which a different inductor 14 and a pair of pre-set capacitors 18 and 20 are connected in the network on each of the four bands covered by the transmitter, but the same two variable capacitances 17 and 19 are used on all four bands.

Suitable values for the components in the π-network 12 are as follows:

Variable capacitor 17—Swing of 22.4 picofarads.
Variable capacitor 19—Swing of 108 picofarads.

| | Band 1 | Band 2 | Band 3 | Band 4 |
|---|---|---|---|---|
| Inductor 14 (in microhenries) | 0.694 | 0.380 | 0.210 | 0.122 |
| Minimum capacitance between terminals 11 and 13 (in picofarads) | 25.2 | 25.1 | 24.8 | 24.7 |
| Minimum capacitance between terminals 15 and 16 (in picofarads) | 84.5 | 99.1 | 107.1 | 112.9 |

It is to be understood that the "minimum capacitance between terminals 11 and 13", for example, is the effective value of capacitance between those terminals when the capacitor 17 has its minimum value and is contributed to by the anode shunt capacity of the valve 9 (represented by the capacitor 23), the minimum value of the capacitor 17 (which value is small), the capacitor 18, and any stray capacitance including that due to wiring and between the capacitor 10 and ground.

The value of each of the variable capacitors 17 and 19 varies linearly with the angular position of its shaft and the shafts of both capacitors 17 and 19 are directly ganged to the shaft of the variable capacitor 3 in the oscillator 1. Thus, the tuning of the π-network 12 and the frequency of the output of the transmitter are both adjusted together by means of the control knob 4.

The circuit is designed so that for optimum performance, that is to say when the aerial 21 is correctly matched to the feeder cable 24 and the network 12 gives an ideal impedance transformation, the total load impedance presented to the valve 9 is approximately 1,000 ohms. The variation in this load resulting from the capacitors 17 and 19 being ganged is found to be within 7% of the desired value over the whole of the tuning range of the transmitter. The consequential reduction in power radiated from the aerial 21 due to this cause is small compared with the loss of 1.5 dbs. that is permitted in one form of the transmitter under consideration due to possible mismatch between the aerial 21 and the feeder cable 24.

In the transmitter described above the tuning range of the π-network 12 with any one set of components 14, 18 and 20 is 1.36:1. In other arrangements in accordance with the invention this may be increased to about 1.5:1, but beyond this value the mismatch introduced is likely to be unacceptably large.

It will be appreciated that, although in the transmitter described above the tuning of the π-network 12 and the frequency of the output of the transmitter are manually controlled, in other arrangements in accordance with the invention control may be effected automatically, for example, by means of a servo-system arranged to cause the frequency of the output of the transmitter to assume a value having a predetermined relation to the frequency of the output of a local oscillator incorporated in a superheterodyne receiver operating in conjunction with the transmitter. In such an arrangement the transmitter is normally controlled so that the difference between its frequency and the frequency of the local oscillator has a fixed value.

I claim:

1. A radio transmitter comprising: a variable frequency oscillator incorporating a variable reactance element on the value of which the frequency of the output of the oscillator depends; an amplifier arranged to amplify the output of the oscillator; a matching network via which the output of the amplifier is fed to an aerial, the matching network being of π-configuration and incorporating an inductance in its series arm and a variable capacitance in each of its shunt arms; and a control member coupled both to said variable reactance element and said variable capacitances so that the tuning of said network and the frequency of the output of the transmitter may be varied in step over a range of frequencies by means of said control member.

2. A radio transmitter according to claim 1 wherein the ratio of the frequency at the upper end of said range of frequencies to the frequency at the lower end of said range of frequencies is not greater than 1.5:1.

3. A transmitter according to claim 1 wherein a separate pre-set capacitor is connected in parallel with each said variable capacitor.

4. A transmitter according to claim 3 arranged to operate over a plurality of different ranges of frequencies in each of which ranges an inductance of a different value is incorporated in the series arm of the matching network, and separate pre-set capacitors are connected in parallel with the variable capacitors in the shunt arms of the matching network, the same variable capacitors being utilised on all said ranges.

5. A transmitter according to claim 1 wherein said variable reactance element is a variable capacitance.

6. A transmitter according to claim 5 wherein the values of said variable capacitances vary linearly with movement of said control member.

References Cited

UNITED STATES PATENTS

| | | | |
|---|---|---|---|
| 2,355,275 | 8/1954 | Cawein | 334—83 XR |
| 2,679,005 | 5/1954 | Bataille et al. | 325—171 XR |

ROBERT L. GRIFFIN, Primary Examiner

CARL R. VONHELLENS, Assistant Examiner

U.S. Cl. X.R.

325—124; 334—83